United States Patent [19]

Cohen et al.

[11] Patent Number: 4,566,310

[45] Date of Patent: Jan. 28, 1986

[54] METHOD OF INSPECTING THE OPERATION OF A VALVE AND MECHANICAL TEST BENCH FOR PERFORMING THE METHOD

[75] Inventors: Serge Cohen, Meudon la Foret; Gilbert H. K. Nguyen, Paris, both of France

[73] Assignee: Framatome & Cie, Courbevoie, France

[21] Appl. No.: 474,093

[22] Filed: Mar. 10, 1983

[30] Foreign Application Priority Data

Mar. 31, 1982 [FR] France ............................... 82 05543

[51] Int. Cl.$^4$ ......................................... G01M 19/00
[52] U.S. Cl. .......................................... 73/9; 73/168
[58] Field of Search .................... 73/3, 4, 168, 432 V, 73/9

[56] References Cited

U.S. PATENT DOCUMENTS

| 2,859,621 | 8/1984 | Knopf et al. | 73/432 R |
| 2,979,945 | 4/1961 | Tibbetts | 73/168 |
| 4,029,122 | 6/1977 | Jaegtnes | 73/168 |
| 4,274,438 | 6/1981 | LaCoste | 73/9 |
| 4,428,223 | 1/1984 | Trevisan | 73/168 |

Primary Examiner—S. Clement Swisher
Attorney, Agent, or Firm—Pollock, Vande Sande & Priddy

[57] ABSTRACT

Method and a device for inspecting the operation of a valve. The valve (1, 11) is placed on a test bench (2, 3) capable of applying an opening and closing force to the valve, a representative graph of the movement of the valve as a function of the force applied is plotted, the coordinates of which are measured continuously, and the graph of the test is compared with a reference graph ($C_1$) in order to detect operating defects according to the positions of the valve. The invention is applicable to the inspection of valves for passing fluids, more specifically in the nuclear industry.

1 Claim, 3 Drawing Figures

METHOD OF INSPECTING THE OPERATION OF A VALVE AND MECHANICAL TEST BENCH FOR PERFORMING THE METHOD

The subject of the invention is a method and a mechanical test bench for inspecting the operation of a valve, used particularly in the cocks and fittings of a nuclear power station.

In installations with difficult access, and particularly nuclear power stations, it is essential to be certain at all times of the operation of the cocks and fittings, and particularly of the opening and closing of the valves.

Conventional calibration operations are intended only to adjust and monitor the opening pressure of the valves.

On the other hand, the opening and the closing of the valves can be checked, but it is preferable, even when the valve appears to operate normally, to inspect the change with time of the operating conditions so as to detect defects in advance, before they have had any consequences.

For this purpose the checking of the operation of the valves is undertaken periodically by means of a transportable device which can be fitted onto the assembly to be inspected, or by means of a test bench on which the valve to be checked is placed after having been demounted with its drive system.

Thus, in a known device, the velocity of the fluid circulating in the booster is measured in order to have an indication of the flow required to close the valves.

In another known device, the electrical values of the servo drive of the cocks and fittings are measured, and hence this device is applied solely to cocks with electric motors.

Now, since the mechanism of a valve consists essentially of a rod equipped with a flap at one end and sliding through one or more bearings, the flap being applied to an orifice by the tension of a spring, it is desirable to check the operation of this mechanical assembly directly, i.e., to inspect the movement of the rod in its bearings throughout the intended stroke.

To this end, the invention has as its object a method of inspection employing an entirely mechanical test bench and permitting inspection not only of the movement of the valve, but also of the progress of the opening/closing cycle, by checking the proportionality between the force applied and the movement.

Thus, the invention permits the inspection of the suitability of a valve to fulfil its function, i.e., to open at a given pressure, to discharge the fluid with a definite flow and to close again.

According to the invention, the valve to be inspected is placed on a test bench applying an opening and closing force to the valve, a representative graph of the movement of the rod of the valve as a function of the force applied is plotted, the coordinates of which are measured continuously, and the graph of the test is compared with a reference graph in order to detect the operating defects according to the position of the rod of the valve.

Preferably a plurality of opening and closing cycles of the valve are performed with one and the same speed of movement and the representative curves of the said cycles are superposed on one and the same graph in order to detect discontinuities and the absence of superposition corresponding to operating defects.

It is desirable to perform a plurality of series of opening and closing cycles of the valve with different speeds for each series.

The invention also has as its object a mechanical test bench for performing the method, comprising a support frame for the valve to be tested, which has been demounted with its drive mechanism, a drive member for the movement of the valve counter to the action of the spring in the opening and closing direction of the valve, associated with a means of measuring the force applied to the valve, a movement pick-up to measure the position of the valve, and a plotting table to which representative signals of the movement and of the force applied are passed in order to plot a representative curve of the test.

In a preferred embodiment, the drive member for the movement of the valve is a single-acting jack connected to a pressurised fluid circuit with two branches, one branch supplying the jack in order to open the valve counter to the action of the spring, the other branch draining in order to close the valve by the action of the spring, each branch being equipped with a flow regulator in order to regulate the speed of movement of the valve.

The invention will now be described with reference to a particular embodiment, given by way of example and illustrated in the accompanying drawings.

Figure 3:
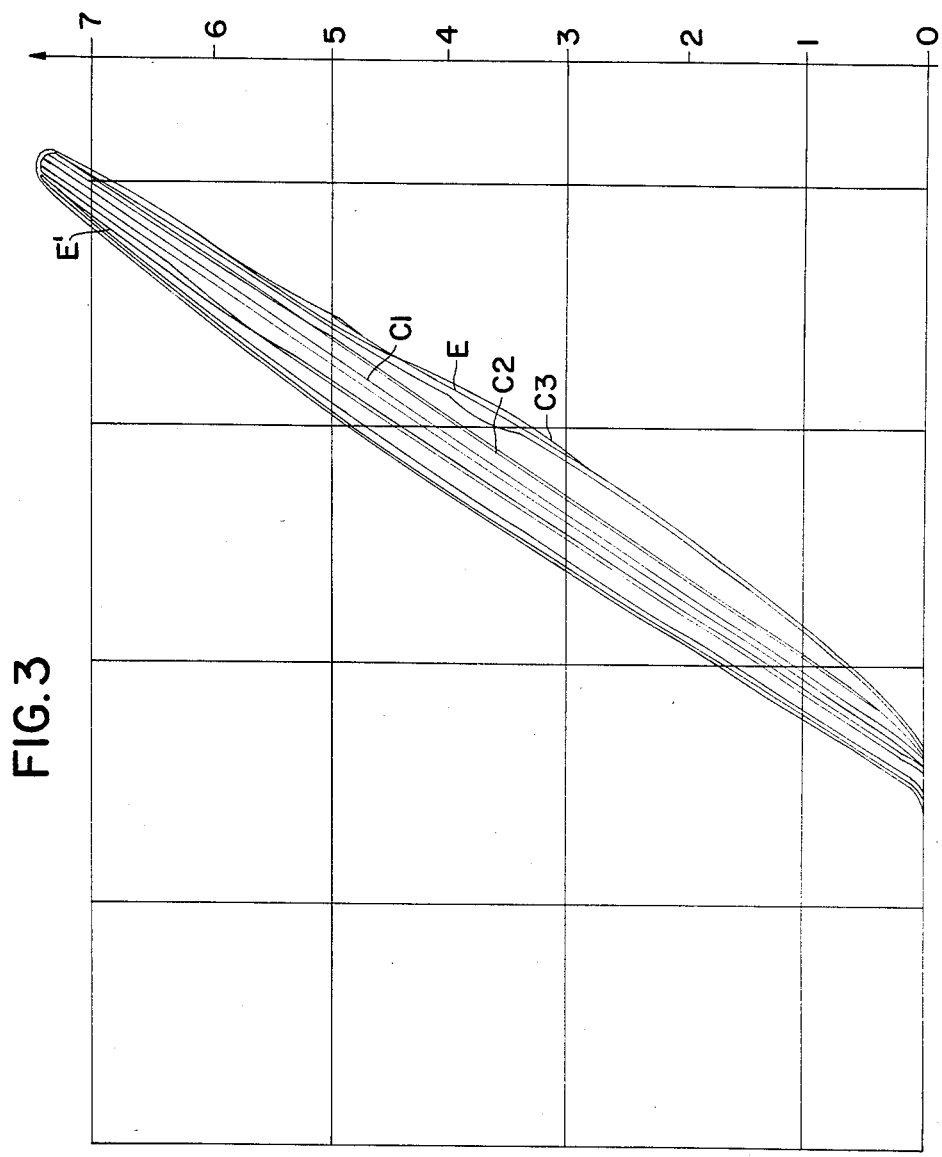

FIG. 3 gives by way of example a representative graph of a plurality of tests.

Figure 1:
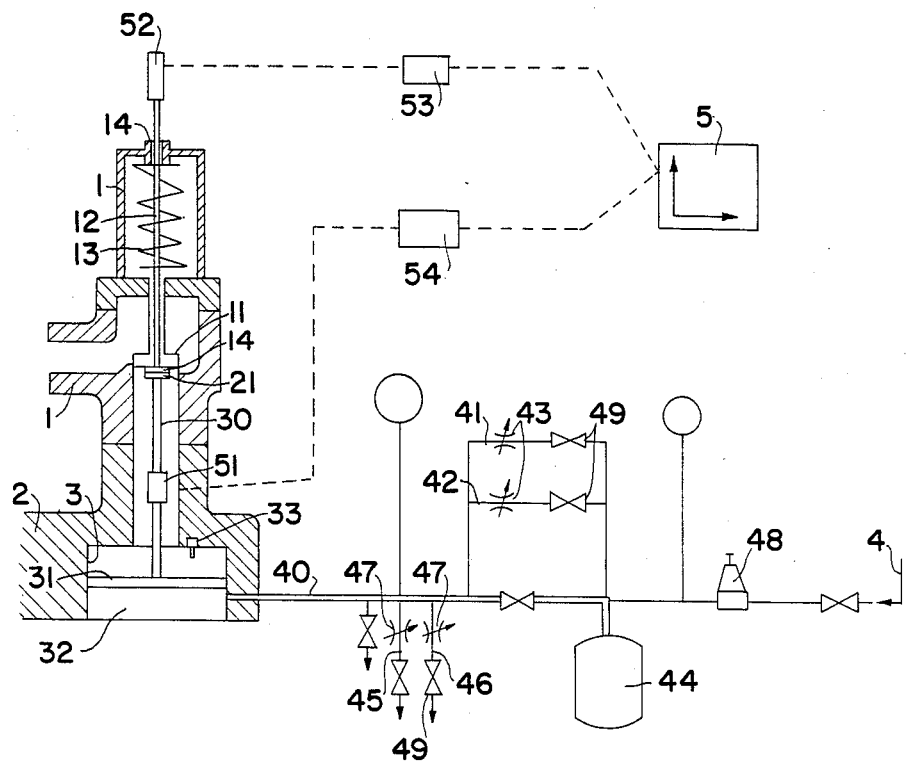
FIG. 1 is a general diagram of the test bench.

The valve, shown schematically in FIG. 1, consists of a housing 1 within which a flap 11 moves, fixed to an axial rod 12 which slides in bearings (not shown), the flap 11 being applied by a spring 13 against an orifice 14 of the housing 1.

After having been demounted, the assembly of the valve is placed on the frame 2 of the test bench, in which there is mounted a jack 3 which drives the vertical sliding of a rod 30 fixed to the piston 31 and bearing at its upper end upon the flap 11 of the valve, through the intermediary of a support plate 21 whose shape is adapted to that of the flap. A force pick-up 51 measures the force applied, in one or the other direction, to the rod 30 in order to open and close the flap 11.

In the example shown, the jack 3 is single-acting, the piston 31 limiting a chamber 32 connected by a pipe 40 to a supply circuit 4, in which an accumulator 44 is placed to maintain the pressure, the latter being regulated by a reducing valve 48.

The force pick-up 51 is, e.g., a dynamometer with electric gauge which, through the intermediary of a gauge modulator 54, transmits to a plotting table 5 representative signals of the force applied, in one or the other direction, to the drive rod 30.

On the other hand, the position of the flap 11 is detected by a movement pick-up 52 which, through the intermediary of an amplifier 53, transmits to the plotting table 5 representative signals of the position of the flap.

The jack 3 is preferably actuated by compressed air. The supply circuit comprises two parallel branches 41 and 42 permitting the jack to be supplied in two different flow ranges corresponding, respectively, to a slow rise and a rapid rise. A cock 49 and a flow reducer 43 are fitted in each of the branches 41, 42, which permits the supply flow, and hence the speed of movement of the jack, to be regulated. On the other hand, the amplitude of the movement is regulated by a stroke regulating stop 33 of the piston 31.

The supply of the chamber 32 therefore permits the flap 11 to be raised, opposing the spring 13 which, when the pressure is eliminated, restores the flap into the bottom position by lowering the piston 31. The chamber 32 is drained through one of the two pipes 45, 46 fitted in parallel on the pipe 40 and corresponding, respectively, to a large flow for a rapid descent and to a small flow for a slow descent. A cock 49 and a flow reducer 47 are placed in each of the pipes 45, 46, permitting the speed of descent to be regulated.

At each cycle of rise and fall, the force required for the rise of the flap and the force resisting its descent are measured by the pick-up 51, and the movement of the valve by means of the pick-up 52. These two values are converted into signals passed to the plotting table, which plots a representative curve of the movement (d) shown as ordinate as a function of the force (f) shown as abscissa.

Figure 2:
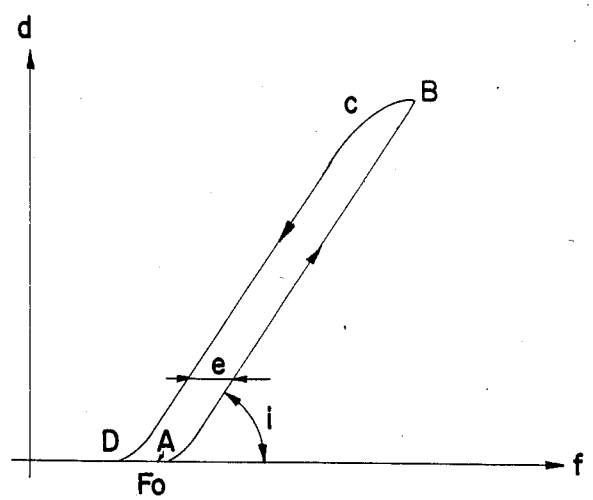
FIG. 2 is a graph showing the representative curve of the movement as a function of the force applied.

A representative curve has been illustrated by way of example in FIG. 2. It has roughly the shape of a parallelogram having two substantially parallel sides AB and CD corresponding respectively to the opening of the valve (AB) and to its closure (CD).

The abscissa of the point $F_O$ from which the valve begins to open gives the initial opening force of the valve, which is defined from the calibration pressure.

The horizontal interval (e) between the sides AB and CD characterises the mechanical frictions which arise during the sliding of the rod in its bearings.

The angle (i) of inclination of the sides AB and CD with reference to the horizontal characterises the stiffness of the spring of the valve.

A single curve plotted for a single test would already make it possible to have an idea of the operation of the valve and to detect certain anomalies. For example, if the initial opening force $F_O$ does not confirm the calibration pressure, there may be a deterioration of the nozzle involving a drift in the calibration time of the valve.

On the other hand, a wide spacing (e) indicates undesirable frictions and a risk of jamming in the open position of the valve.

These data can be given particularly by comparing the curve plotted following a test, during a maintenance operation, with the initial curve of the new valve, which permits possible anomalies to be detected and preventive action to be taken if appropriate.

However, it is also desirable to vary the speed of movement of the valve and to perform a plurality of opening and closing cycles of the valve with the same speed. It is also possible to perform a plurality of series of opening and closing cycles with different speeds for each series.

FIG. 3 shows, by way of example, the curve $C_1$ which corresponds to the operation of the new valve, a plurality of curves $C_2$ corresponding to tests each performed in one minute, and a plurality of curves $C_3$ corresponding to tests of three seconds. In principle, three opening and closeing cycles will be performed with the same speed of movement of the flap.

It is found that, for each speed, the curves of type $C_2$ or $C_3$ superpose more or less perfectly, this superposition being the better as the speed of movement is slower.

Poor reproducivity of the curves like that which is observed at E on the curves $C_3$ indicates the presence in the mechanical assembly of mobile impurities which necessitate demounting and cleaning of the valve.

However, even when the curves are reproduced identically to each other, they may present discontinuities such as bulges or hollows, e.g. as at E'. These permanent discontinuities are accepted when the deviation from the reference curve $C_1$ remains within the tolerated limits.

More generally, movements of the rod may be performed with speeds of movement which may vary from 0.1 mm/s to 2.5 mm/s. The slow speeds of movement will permit demonstration of undesirable frictions, hard points in the guide chain of the flap being expressed by a widening of the spacing (e).

On the other hand, tests at fast speed of movement simulate the real operation of the valve and permit the correct operation of the shock absorber to be inspected in the case of a shock-absorbed valve.

The operation of the test bench is easy. First of all, the gains of the amplifiers, of the gauge modulator and of the plotting table are regulated as a function of the characteristics of the movement pick-ups and of the dynamometer, as well as of the range of variations intended for the movement and the force, in order to obtain a curve of required dimensions on the plotting table.

A regulation of the stop of the jack is then made to a position determined by the desired stroke, as well as a regulation of the flow reducers placed in the supply and drain circuits in order to regulate the rise and fall speeds.

The speed is determined by the measurement of the time necessary for the completion of a cycle, e.g., by means of a chronometer tripped manually or by electronic means.

At the start of the test, all the cocks 49 placed in supply circuits 41 and 42 and drain circuits 45 and 46 are closed. The cock 49 of the circuit 42 is opened for a slow speed opening test regulated by the flow reducer 44, and when the jack reaches the stop, the circuit 42 is closed and the circuit 46 is opened for the downward closing movement of the valve.

Similarly, for a fast speed test, the circuits 41 and 45 are opened and closed alternately.

Obviously, the various cocks may be opened and closed manually or automatically on arrival of the piston 31 at the top or bottom stop.

I claim:

1. Mechanical test bench for a valve consisting of a flap (11) fixed to a rod (12) for sliding movement within a housing (1) by the action of a spring drive mechanism (13), comprising
   (a) a support frame (2) for the valve to be tested, which has been dismounted with its drive mechanism;
   (b) a jack (3) for the movement of said valve at adjustable speed, counter to the action of said spring, in the opening and closing direction of said valve, associated with a means (51) of measuring the force applied to said valve (11);
   (c) a supply circuit (4) for supplying said jack (3) with a fluid, comprising two parallel branches (41, 42) supplying said jack (3) in two different flow ranges, each branch being equipped with a flow regulator (43);
   (d) a drain circuit for evacuating said fluid from said jack during the closing movement of said valve under the effect of said spring, said drain circuit comprising two branches (45, 46) respectively corresponding to the flow ranges of the two branches (41, 42) of said supply circuit, each of said branches (45, 46) of said drain circuit being equipped with a flow regulator (47);

(e) a movement pick-up (52) to measure the position of said valve (11); and
(f) a plotting table (5) to which representative signals of the movement and of the force applied are passed in order to plot a representative test curve (C).

* * * * *